(12) United States Patent
Borg

(10) Patent No.: US 7,952,763 B2
(45) Date of Patent: May 31, 2011

(54) SMOOTHLY CHANGING GRAY LEVELS IN COLOR TRANSFORMS

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/964,111

(22) Filed: Dec. 9, 2010

(65) Prior Publication Data

US 2011/0075222 A1    Mar. 31, 2011

Related U.S. Application Data

(63) Continuation of application No. 12/014,668, filed on Jan. 15, 2008, now Pat. No. 7,859,721.

(51) Int. Cl.
*H04N 1/60* (2006.01)
(52) U.S. Cl. .......... 358/1.9; 358/518; 358/521; 358/523
(58) Field of Classification Search .................... 358/1.9, 358/3.01, 3.21, 3.23, 3.26, 504, 518–523; 382/162, 167, 274
See application file for complete search history.

(56) References Cited

U.S. PATENT DOCUMENTS

| | | | |
|---|---|---|---|
| 6,137,594 A | 10/2000 | Decker et al. | |
| 6,919,972 B2 | 7/2005 | Kumada et al. | |
| 7,312,893 B2 | 12/2007 | Bestmann et al. | |
| 7,679,783 B2 | 3/2010 | Pellar | |
| 2006/0170993 A1 | 8/2006 | Jacob | |
| 2009/0103118 A1* | 4/2009 | Sawada | 358/1.9 |

* cited by examiner

*Primary Examiner* — Scott A Rogers
(74) *Attorney, Agent, or Firm* — Fish & Richardson P.C.

(57) ABSTRACT

Systems and methods, including computer software products, for processing gray colors in a conversion between color spaces involve identifying a non-pure gray color value in a color space that represents a substantially gray color. The methods further include converting the non-pure gray color value to a corresponding pure gray color value in the color space. The methods also include determining a first difference vector between the non-pure gray color value and the corresponding pure gray color value. The methods further include determining a distance between the corresponding pure gray color value and a selected color value. The corresponding pure gray color value represents a nearest pure gray color value to the selected color value. The methods also includes determining a correction factor based on the first difference vector and the distance and applying the correction factor to the selected color value to produce a corrected color value.

20 Claims, 9 Drawing Sheets

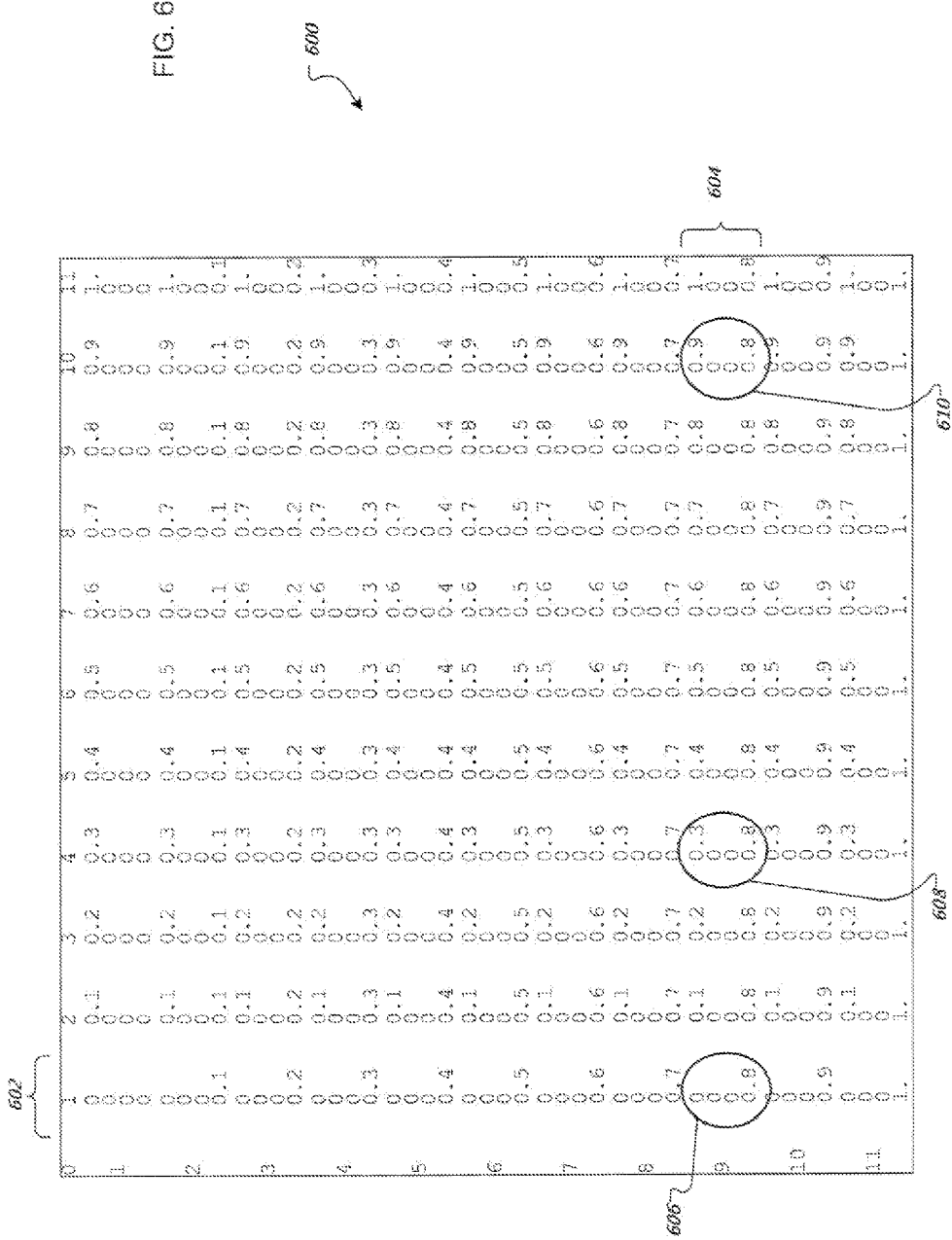

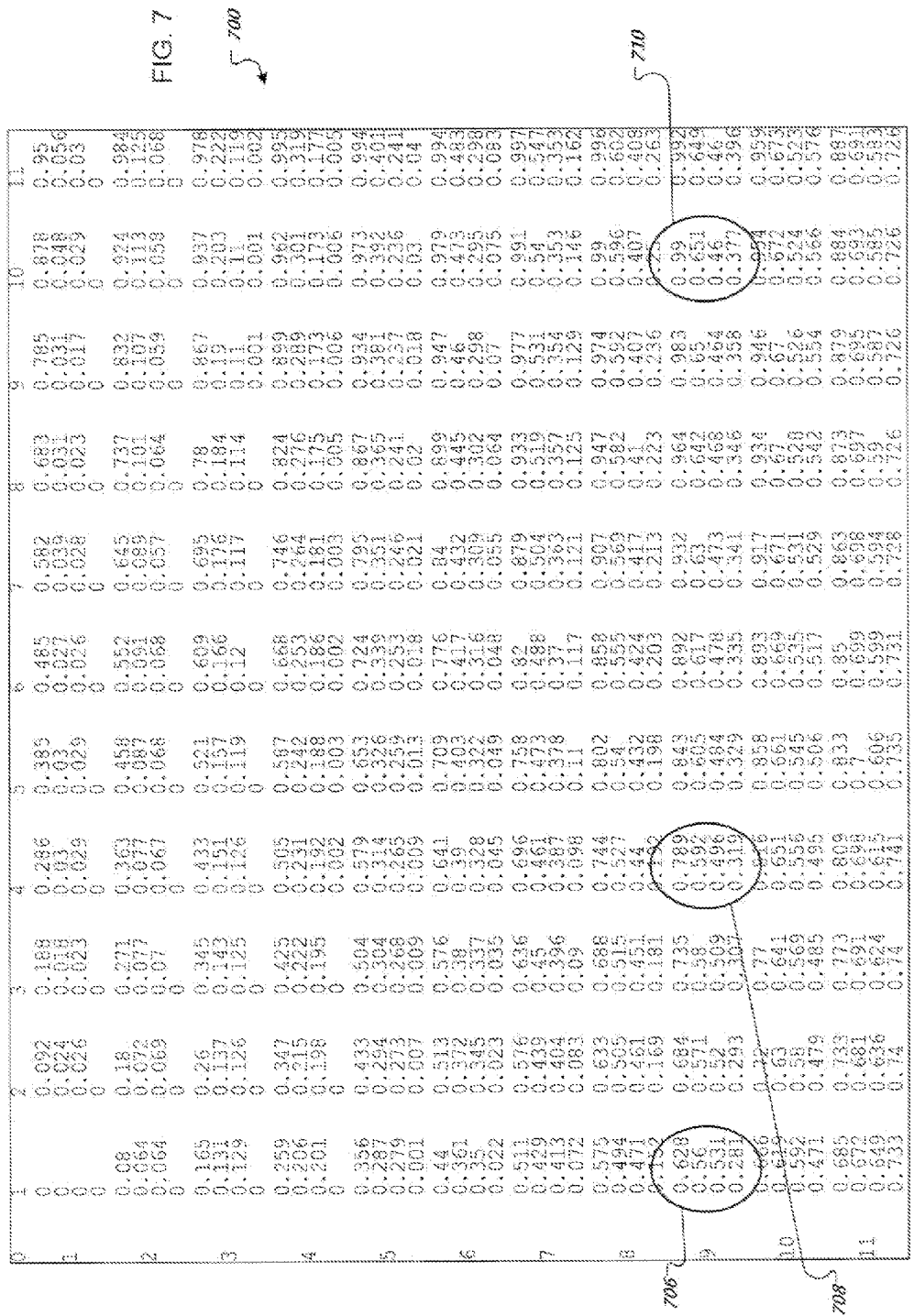

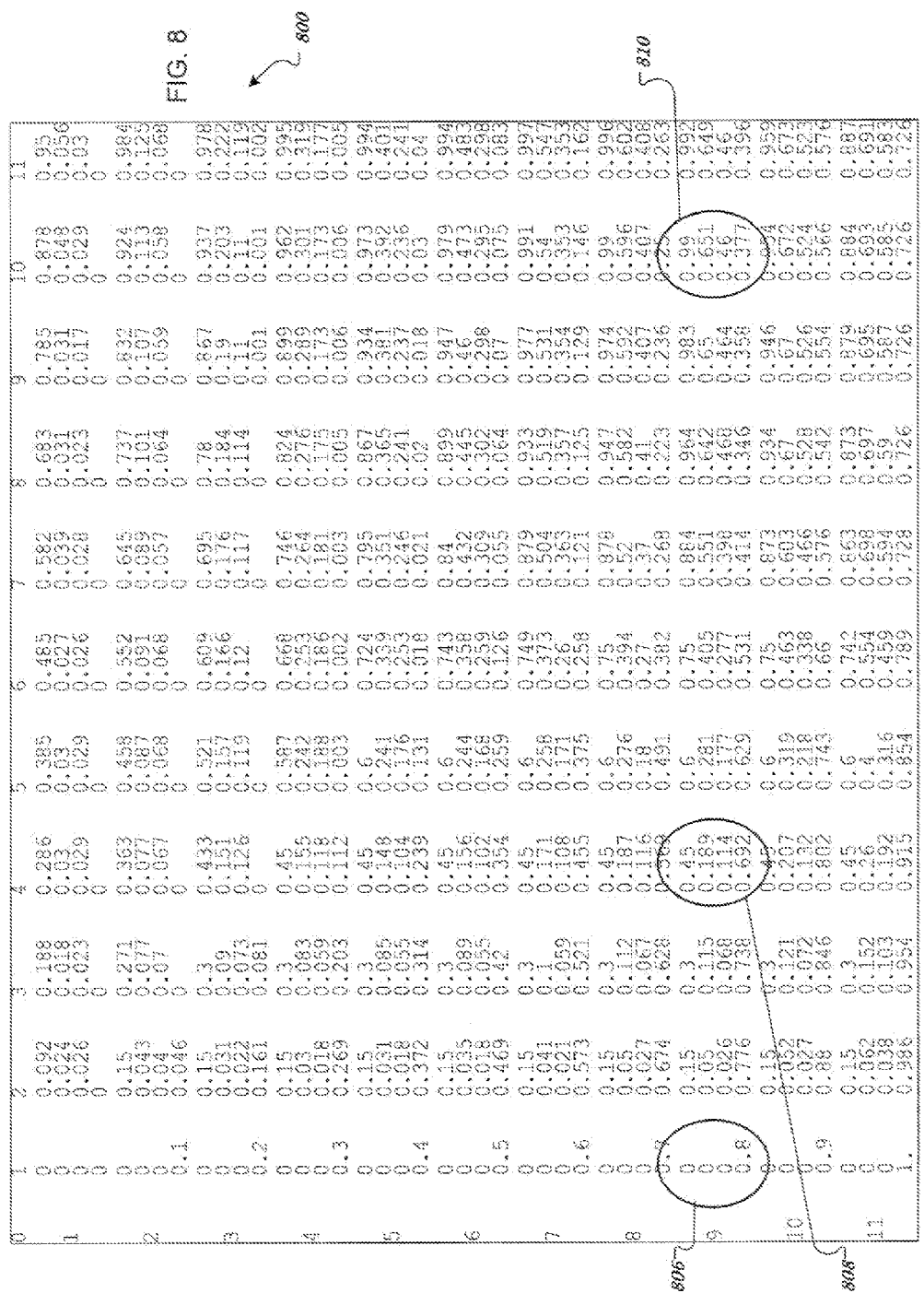

SMOOTHLY CHANGING GRAY LEVELS IN COLOR TRANSFORMS

CROSS REFERENCE TO RELATED APPLICATION

This application is a continuation of, and therefore claims the benefit of priority under 35 USC 20 of U.S. patent application Ser. No. 12/014,668 filed on Jan. 15, 2008, entitled "Smoothly Changing Gray Levels in Color Transforms", which is incorporated herein by reference in its entirety.

BACKGROUND

The present disclosure relates to the field of data processing, and more specifically to smoothly changing the gray levels in color transforms.

Digital devices that create (e.g., scanners and digital cameras), display (e.g. CRT and LCD monitors), or print (e.g. ink jet and laser printers) colors typically define color data using color spaces. Generally, a color space is a combination of a color model and a gamut. A color model defines each color within the model using primary color components, such as, in the case of a Red, Green, Blue (RGB) color model, the levels of red, green, and blue light components needed to create each color, or in the case of a Cyan, Magenta, Yellow, and Key (CMYK) color model, the levels of cyan, magenta, yellow, and black ink needed to create each color. Levels of each component the color models typically range from 0 to 100 percent of full intensity. By varying the levels or intensities of the components, each color in the color model may be created. However, as a practical matter a device is often limited in its ability to create pure red, green, or blue light, which limits its range of colors or color gamut. A gamut is simply the range of colors that may be displayed on, rendered by, or captured by a particular device.

The differences in device gamuts and primary color definitions lead to differences in color spaces between devices. For example, two devices that use RGB may show different colors when each displays its most intense red. The most intense red on a first device may have an intensity of 1 for the R component and 0 for the G and B components. However, the color that looks the same as the most intense red of the first device may have a red intensity of 0.85 on a second device. Moreover, the G and B component intensities may even be 0.05 on the second device. In other words, the same perceived "red" color has different RGB component values depending on the device, on the first device it may be (1, 0, 0) and on the second device that same "red" may be (0.85, 0.05, 0.05). This means that an image file containing only RGB values, if displayed directly by both devices, would appear differently on the two devices.

To solve this problem of the same component values appearing differently on different devices, color spaces are defined in relation to device-independent color spaces, which define colors in more absolute terms. Some examples of device-independent color spaces include the CIE XYZ and CIE L*a*b* color spaces. The relationship of a device's native color space with a device-independent color space typically is described by some combination of formulas, transfer functions, matrices, and look up tables. This relationship may be stored in an International Color Consortium (ICC) profile for the device. The device-independent color space may be used as an intermediate when converting from one device-dependent color space to another.

The conversion from one color space to another may be done through a series of conventional processing steps. Some processing steps may be more computationally intensive than others. Some processing steps may require interpolation. Generally, there is a tradeoff between the number of steps, the complexity of each step, speed, and accuracy. In some applications, speed is of the essence and accuracy is sacrificed by reducing the number of steps and/or the complexity of the individual steps. Often to increase speed, a look up table (LUT) is used either alone or with another simple processing step. A LUT maps points in one color space to corresponding points in another color space. For example, a color in a first RGB color space may have the color component values of (0, 45, 82) which, when converted to a second RGB color space, the color may have the color component values (5, 51, 76). This is because the ICC profile for each color space defines pure R, G, and B components differently. A LUT may be constructed by transforming a regularly spaced grid of colors in a first color space to a second color space using the most accurate processing steps, such as using the ICC profiles for example. Each grid point and its corresponding transform point in the second color space may be stored in the LUT. Converting colors that do not correspond to the grid points would involve interpolation, therefore, the more grid points the more accurate the conversion. However, increasing the number of the grid points complicates the LUT and may result in an increase in processing time.

Gray colors are often specified using the K channel of a CMYK color space. When colors are converted from one CMYK color space to another CMYK color space, such as in the case of going from editing to printing, source colors having only a K component value (e.g., (0, 0, 0, 50)) may be converted to a four channel CMYK color (e.g., (21, 22, 33, 34)), which may result in an undesirable image or wasted ink. Similarly, converting from a gray RGB color value to the CMYK space may result in a four channel CMYK color value.

SUMMARY

This specification describes technologies relating to smoothly changing the gray levels in color transforms.

Systems and methods, including computer software products, for processing gray colors in a conversion between color spaces involve identifying a non-pure gray color value in a color space. The non-pure gray color value represents a substantially gray color. The systems and methods further include converting the non-pure gray color value to a corresponding pure gray color value in the color space. The method also includes determining a first difference vector based on a difference between the non-pure gray color value and the corresponding pure gray color value. The method further includes determining a distance between the corresponding pure gray color value and a selected color value in the color space. The corresponding pure gray color value represents a nearest pure gray color value to the selected color value in the color space. The method also includes determining a correction factor based on the first difference vector and the distance and applying the correction factor to the selected color value to produce a corrected color value.

These and other embodiments can optionally include one or more of the following features. Each color value in the color space can include a plurality of non-gray color component values and a gray color component value. The non-pure gray color value can include non-gray color component values having non-zero values and the pure gray color value comprises non-gray color component values having a zero value. The color space can include a target color space and the selected color value comprises a selected color value in the target color space, and the embodiments can further include determining a lookup table for converting from a source color space to the target color space, where each color value in the target color space corresponds to a color value in the source color space. The non-pure gray color value can be identified based on a correspondence to a pure gray color value in the source color space. The distance can be determined based on a proximity between the selected color value and the pure gray color value in the look up table. The source color space can include a Red, Green, Blue (RGB) color space; each pure gray color value in the source color space can include Red, Green, and Blue component values that are equal to one another; and each non-pure gray color value can include Red, Green, and Blue component values that are not equal to one another.

The distance can be determined based on a comparison of the first difference vector between the selected color value and the corresponding pure gray color value with difference vectors between other color values in the color space and the corresponding pure gray color value. The embodiments can further involve converting a plurality of non-pure gray color values to a plurality of corresponding pure gray color values in the color space, where the distance between the corresponding pure gray color value and the selected color value in the color space is less than a distance between the selected color value and each of the plurality of corresponding pure gray color values. Determining the correction factor can include: determining a maximum change amount between the selected color value and the corresponding pure gray color value based on the distance; and determining the correction factor by scaling the first difference vector by an amount such that a difference between the scaled first difference vector added to the selected color value and the corresponding pure gray color value is not greater than the maximum change amount. The maximum change amount can be determined by multiplying the distance by a correction gradient associated with a rate that a color component changes from adjacent color values in the color space.

The embodiments can also involve determining a second difference vector based on a difference between the non-pure gray color value and the selected color value. The correction factor can be based on the first and second difference vectors and the determined distance. Determining the correction factor can include determining a maximum change amount between the selected color value and the corresponding pure gray color value based on the distance; replacing a gray component value of the second difference vector with zero; subtracting from each of a plurality of non-gray component values of the second difference vector a mean of the plurality of non-gray component values of the second difference vector; replacing negative component values of the second difference vector with zero; scaling the second difference vector using optimization factors and a maximum of absolute values of component values of the first difference vector; adding the first and second difference vectors to obtain a third difference vector; and determining the correction factor by scaling the third difference vector by an amount such that a difference between the scaled third difference vector added to the selected color value and the corresponding pure gray color value is not greater than the maximum change amount. The second color space can include a Cyan, Magenta, Yellow, Key (CMYK) color space, and the optimization factors can be approximately 2, 1, and 0.5 for the Cyan, Magenta, and Yellow components respectively.

Particular embodiments of the subject matter described in this specification can be implemented to realize one or more of the following advantages. The print quality for pure gray colors may be increased. The print quality for other colors may be unchanged or decreased negligibly. Banding and other color artifacts, such as halos, also may be significantly reduced. The modified conversion transform may be created quickly, which enables certain embodiments to be used in a variety of situations.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 6 is a table of example CMYK inputs of a source color space to be converted to CMYK outputs of a destination color space.

FIG. 7 is a table of example CMYK outputs of a destination color space determined by transforming the example inputs of FIG. 6 using conventional methods.

FIG. 8 is a table of example smoothed CMYK outputs of a destination color space determined by transforming the example inputs of FIG. 6 using an embodiment of the subject matter described herein.

FIG. 9 is a table of the differences in the magnitudes of each component as determined between the conventional CMYK outputs and the smoothed CMYK outputs.

Like reference numbers and designations in the various drawings indicate like elements.

DETAILED DESCRIPTION

Image processing work flows often require the conversion of files from one color space to another, even if the color spaces are based on the same color model, such as the Cyan, Magenta, Yellow, and Key (CMYK) color model. For example, a desktop publishing file may be created and edited using a desktop publishing software program that consistently used a source CMYK color space defined by a first International Color Consortium (ICC) profile. That file may then be sent to a printing press that uses destination CMYK color space defined by a second ICC profile. In order to print the desktop publishing file in a way that preserves the intended color, the printing press would convert the file from the source color space to the destination color space using the ICC profiles, or a look up table (LUT) created from the profiles. In doing so, however, a source pixel with a color value that is "pure gray" may be converted to a destination color value that is not pure gray. "Pure gray" color values may differ depending on the color space. For example, "pure gray" color values in a CMYK color space are defined as color values whose non-gray component values (C, M, and Y components) are zero and whose gray component value (K component) is usually non-zero. In a Red, Green, Blue (RGB)

color space, "pure gray" color values are defined as color values whose component values (R, G, and B) are all equal. Because of the way many printers render colors, gray colors that have pure gray values (using only K ink) may appear crisp when rendered, while gray colors that have non-zero C, M, and Y component values may appear fuzzy or muddled. Also, less ink may be used to render a gray color using pure gray values than with using the other (usually more expensive) color inks to render the gray color. Thus, it may be desirable to preserve the pure gray nature of gray colors when converting from a source color space to a destination color space. Some conventional methods create a LUT using conventional processing steps and then substitute non-pure gray destination values corresponding to pure gray values with pure gray destination values. Without more, this substitution may result in large interpolation errors, banding, and color artifacts, which reduces the overall print quality. Thus, it may also be desirable to reduce the effects of substituting pure gray destination colors by modifying destination color values that are near the pure gray colors.

Figure 1:
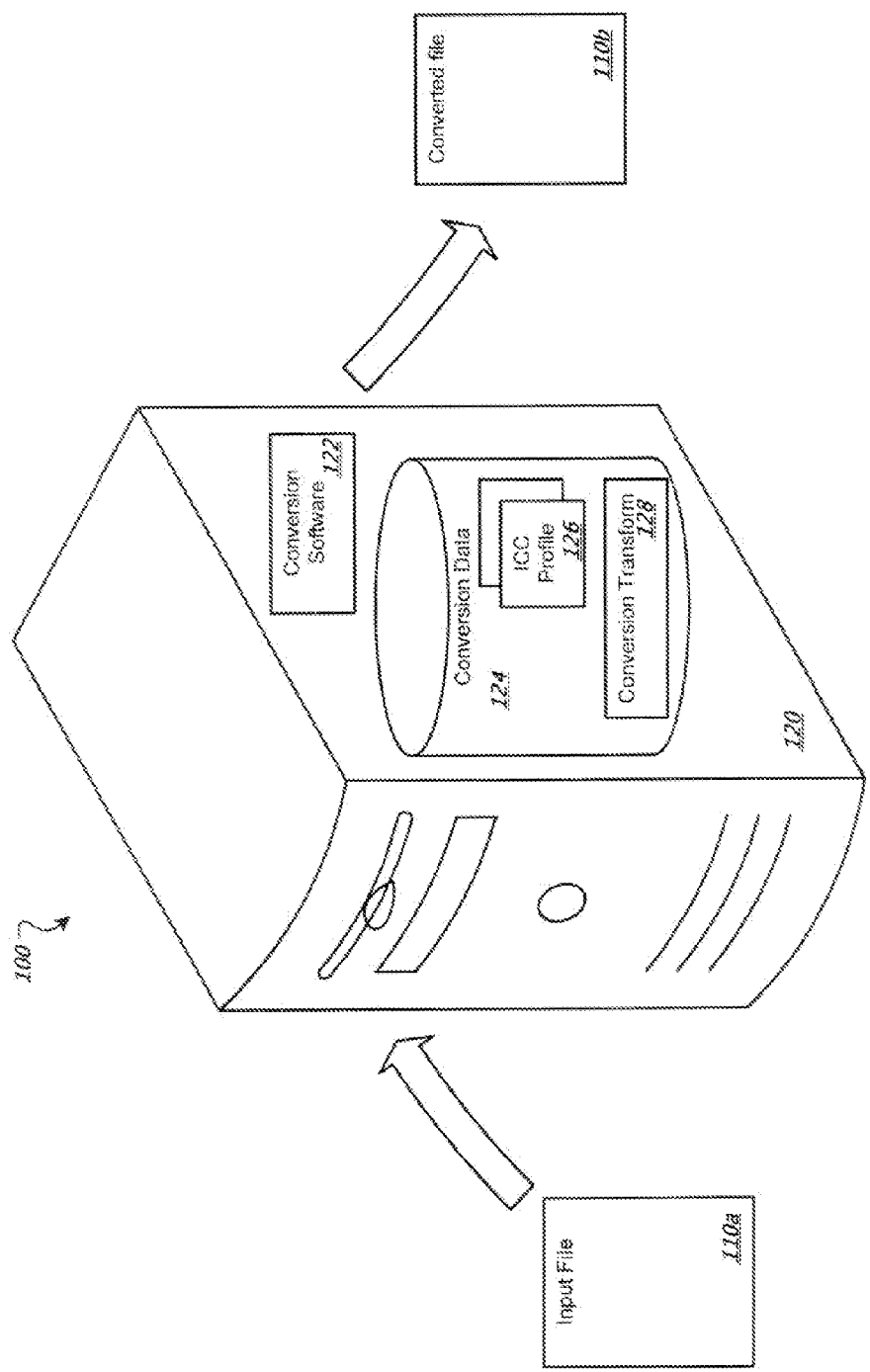
FIG. 1 is a block diagram of a color conversion system.

As shown in FIG. 1, a color conversion system 100 includes a processing machine 120 that receives an input file 110 having colors expressed in a source color space and transmits a converted file 130 having colors expressed in a destination color space. The processing machine 120 includes conversion software 122 and conversion data 124 that stores ICC profiles 126 and a conversion transform 128 that preserves the pure gray nature of the color values. Generally, the color conversion system 100 creates the conversion transform 128 using the conversion software 122 and the ICC profiles 126. The conversion transform 128 may be a modified version of a conventional LUT, where the conventional LUT's destination gray color values are replaced with pure gray color values and destination color values near the gray colors (near gray colors) are modified to smooth the transition from the replaced values to the original values. In some embodiments, the smoothing may reduce the interpolation errors, and thus reduce artifacts such as banding, when converting and rendering near gray colors. Other advantages of some embodiments include rendering gray colors with less ink and increasing the quality (e.g., crispness) of rendered gray colors.

The input file 110a and converted file 110b (collectively, files 110) each may be any collection of electronic data that includes color data defined in a particular color space. The input file 110a generally includes color data in a source color space and the converted file 130 generally includes color data in a destination color space. The files 110 may also include other data, such as text, embedded fonts, images and 2D vector graphics data (data in addition to related color data), digital rights management information, and other types of non-color data. The files 110 may adhere to a given specification or format, including, for example, Extensible Markup Language Paper Specification (XPS), portable document format (PDF), Joint Photographic Experts Group (JPEG), Tagged Image File Format (TIFF), and Portable Network Graphics (PNG) file formats. The source color space may be based on any of a variety of color models, such as RGB, CMYK, YCrCb, and many others. The destination color space may be based on any of a variety of color models and color spaces that include a gray component, such as, for example, CMYK, and CcMmYK. The input file 110 may also include an ICC profile that defines the color space used within the file.

The processing machine 120 is any apparatus, device, or machines for processing data, including, for example, a programmable processor, a computer, or multiple processors or computers. The processing machine 120 can include, in addition to hardware, code that creates an execution environment for the computer program in question, e.g., code that constitutes processor firmware, a protocol stack, a database management system, an operating system, or a combination of one or more of them. The processing machine includes color conversion software 122 and conversion data 124.

Generally, the color conversion software 122 may be a computer program that is executed by the processor 110 to facilitate color conversion. A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one processing machine 120 or on multiple processing machines 120 that are located at one site or distributed across multiple sites and interconnected by a communication network.

The conversion data 124 facilitates the transformation of color data from the source color space of the input file 110 to destination color space of the converted file 130. The conversion data 124 may be described in a table, a matrix, a formula, a flat file, a computer program, or any combination of these. The conversion data 124 may describe or embody any type of processing that is usually associated with color conversion. The processing may be a single step or a series of steps that may utilize any combination of formulas, matrices, or look up tables. The conversion data 124 may include one or more ICC profiles 126 and conversion transforms 128. Generally, an ICC profile 126, associated with a particular color space, is a file that contains information on converting color values in the particular color space to color values in another, usually device-independent, color space.

A conversion transform 128 is a data structure that facilitates the conversion from the source color space to the destination color space. The conversion transform 128 may be implemented as a LUT. A LUT is essentially a multi-dimensional table that maps discrete input points, as given by their multi-dimensional coordinates, to discrete output points. The number of coordinates in the input need not match the number of coordinates of the output. For example, a source color space based on a three-dimensional color model, such as RGB, may be mapped to a destination color space based on a four-dimensional color model, such as CMYK. For instance, an input point having RGB coordinates or component values (19, 19, 19) may be mapped to an output point having CMYK coordinates or components values (0, 0, 0, 27). A LUT for converting between color spaces may be created using data obtained from experimentation or obtained mathematically using known processing steps, such as those that may be defined in ICC profiles 126.

In operation, the processing machine 110 executes the color conversion software 122. In so doing, system 100 may create a conversion transform 128 using the ICC profiles 126. The conversion transform 128 can be implemented as a multi-dimensional LUT. A four-dimensional LUT may be used to map a source CMYK color space to a destination CMYK color space. A conventional LUT may be constructed by transforming a regularly spaced grid of colors in the source color space to the destination color space using conventional processing steps, such as using the ICC profiles 126 for example. Each source color space grid point and its corresponding transform point in the destination color space may be stored in the LUT. Converting colors that do not correspond to the grid points would involve interpolation, therefore, the more grid points the more accurate the conversion, but increasing the number of the grid points complicates the LUT and may result in an increase in processing time. A LUT may contain any number of grid points, for example a 16×16×16×16 LUT may be used to implement the conversion transform 128. Due to the nature of the conventional conversion process, a CMYK to CMYK conventional LUT may contain mappings from a K-only source color to a non-K-only destination color. For example, a source CMYK value (0, 0, 0, 100) may be mapped to (85, 79, 79, 87). In such an instance, the K-only nature of the color is not preserved.

The conventional LUT may be modified to preserve the pure gray nature of the gray colors and to smooth the conversions of colors near the gray colors. The K-only source values may be mapped to corresponding K-only destination using a ramp or other mapping that takes into account the source and destination black ink characteristics such as dot gain and the maximum black (K) ink of the destination color space. A conversion ramp maps varying source values of K going from 0 to 100% in a predetermined number of steps to destination values. The maximum K of the destination color space may be determined by converting the darkest possible color, such as CIE L*a*b* color value of (0, 0, 0), to the destination color space and using the resulting K as the maximum K ink. The conversion ramp may be constructed using the ICC profiles to map the range of K-only values in both the source and destination color spaces to the luminance value in an independent color space, such as the Y component in the CIE XYZ color space. The Y values may then be matched in order to create the conversion ramp. A similar process may be performed to map pure gray colors in a source RGB color space to pure gray colors in a destination CMYK color space.

The pure gray color preservation modification may be made by replacing with a K-only color value each original destination value in the LUT that corresponds to a source grid point having a K-only value. As mentioned before, these original destination color values that correspond to pure gray source colors may have non-zero values for their non-gray color components (e.g., C, M, Y do not equal zero in a CMYK destination color space). The destination pure gray values may be determined by converting the source pure gray values using the conversion ramp described above. After replacing the destination color values with pure gray values, there may be large differences in color component values between the gray colors and those non-gray colors that are closest to the gray colors. For example, a gray destination color that was originally (80, 70, 65, 80) may be replaced with a pure gray value of (0, 0, 0, 100). This new pure gray value, however, may be immediately adjacent to a color having a value of (71, 61, 59, 73), which would be a large difference in the C, M, and Y component values.

The modification to smooth transitions may be accomplished by correcting various destination color values in the LUT. In general, destination color values for the non-gray colors may be corrected using a modified gray component replacement (GCR) method where some of the gray content of the non-gray color is moved from the C, M, and Y channels and placed in the K channel. The extent of the removal of gray content may be adjusted depending on how far away a non-gray color is from the pure gray colors. In some embodiments, adjusting the extent of the GCR may result in a reduction of banding and color artifacts.

The non-gray colors may be corrected by reducing the amount of C, M, and Y component inks (CMY reduction) in the color and replacing them with a comparable amount of K ink. As the distance from the pure gray colors increases, the amount of C, M, and Y reduction may fade to no correction. At a high level, correction is related to the amount that the original destination value for a gray source color shifted when it was replaced by the pure gray destination color value. This correction could be expressed in a difference vector. Destination color values that were proximate to the original destination value for the gray source color become separated even further by the difference vector. This vector could be applied, albeit to a lesser degree, to the proximate destination color values to lessen the gap. The modified GCR may help bring the proximate destination color values closer to the replaced pure gray destination color values. The modified GCR may be implemented using a correction factor, which may be based in part on the difference vector and the distance that the color is away from the gray colors. Other factors may be used with or included in the correction factor. For example, a maximum gain may be established to cap the slope of the lines connecting adjacent grid points, such that large changes are spread over more grid points. The number of grid points changed by the correction factor, in some embodiments, is not predefined. For example, the correction factor may apply to some non-gray color values that are separated from the gray axis or plane by 3 grid points and not applied to some non-gray color values that are separated by a distance of 7 grid points. The correction factor may be affected by the amount of gray content contained in the CMY components. Luminance related content in the corrected non-gray colors may be preserved by adding a K value that is proportionate to the reduced amount of CMY. Color related content in the corrected non-gray colors may be preserved by adding a small amount of gray-free CMY. This gray-free CMY may be based in part on the difference between the CMY component values of the original transform of the non-gray color and the CMY component values of the original transform of the nearest gray color.

After the LUT has been modified, system 100 may receive color data in the input color file 110 and create the converted file 130 from the input file 110 using the LUT.

Figure 2:
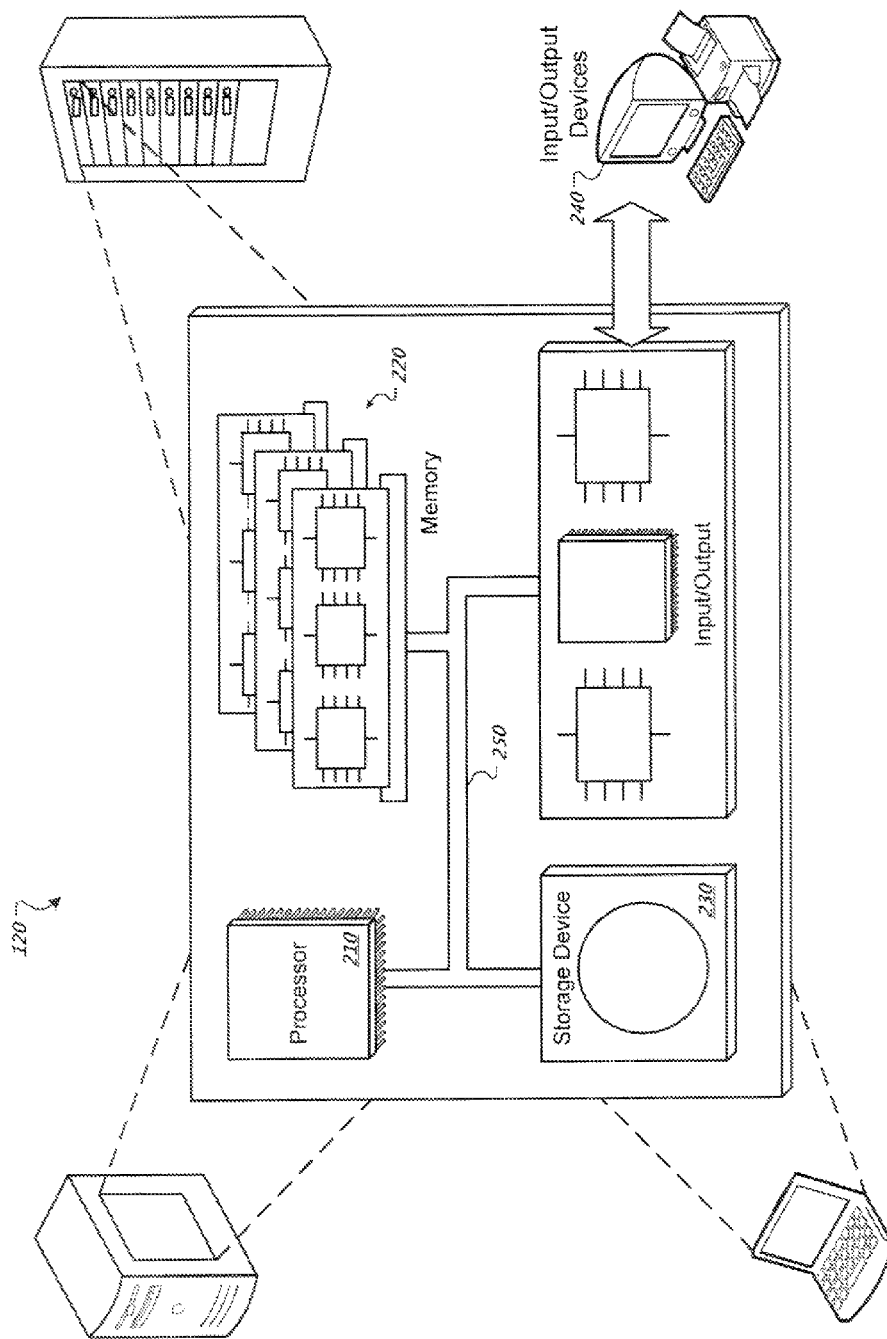
FIG. 2 illustrates an example a processing machine that can be used with the system of FIG. 1.

FIG. 2 illustrates an example a processing machine 120. In general, the processing machine 120 includes a processor 210, memory 220, storage device 230, input/output devices 240, and communications bus 250, which allows the other devices to communicate with one another. Input and output devices 240 include any device that may interact with a processing machine 120, such as printers, monitors, keyboards, trackballs, mice, networks, etc.

A processor 210 may be suitable for the execution of a computer program, and includes, by way of example, both general and special purpose microprocessors, and any one or more processors of any kind of digital computer. Moreover, the processor 210 may be embedded in another device, e.g., a mobile telephone, a personal digital assistant (PDA), a mobile audio player, a Global Positioning System (GPS) receiver, a notebook computer, a desktop computer, or a server, to name just a few possible examples. Generally, a processor will be operatively coupled to receive data and/or instructions from, or transfer data to, a memory 220.

The memory 220 and storage device 230 are computer readable media suitable for storing computer program instructions and data. The memory 220 may be any form of volatile or non-volatile memory, media and memory devices, including by way of example semiconductor memory devices, e.g., DRAM, SRAM, EPROM, EEPROM, and flash memory devices. The storage device 230 may be any form of non-volatile memory, such as magnetic disk drives, e.g., internal hard disks or removable disks; magneto optical disk drives; and CD ROM and DVD-ROM disk drives. The processor 210 and the memory 220 can be supplemented by, or incorporated in, special purpose logic circuitry.

Figure 3:
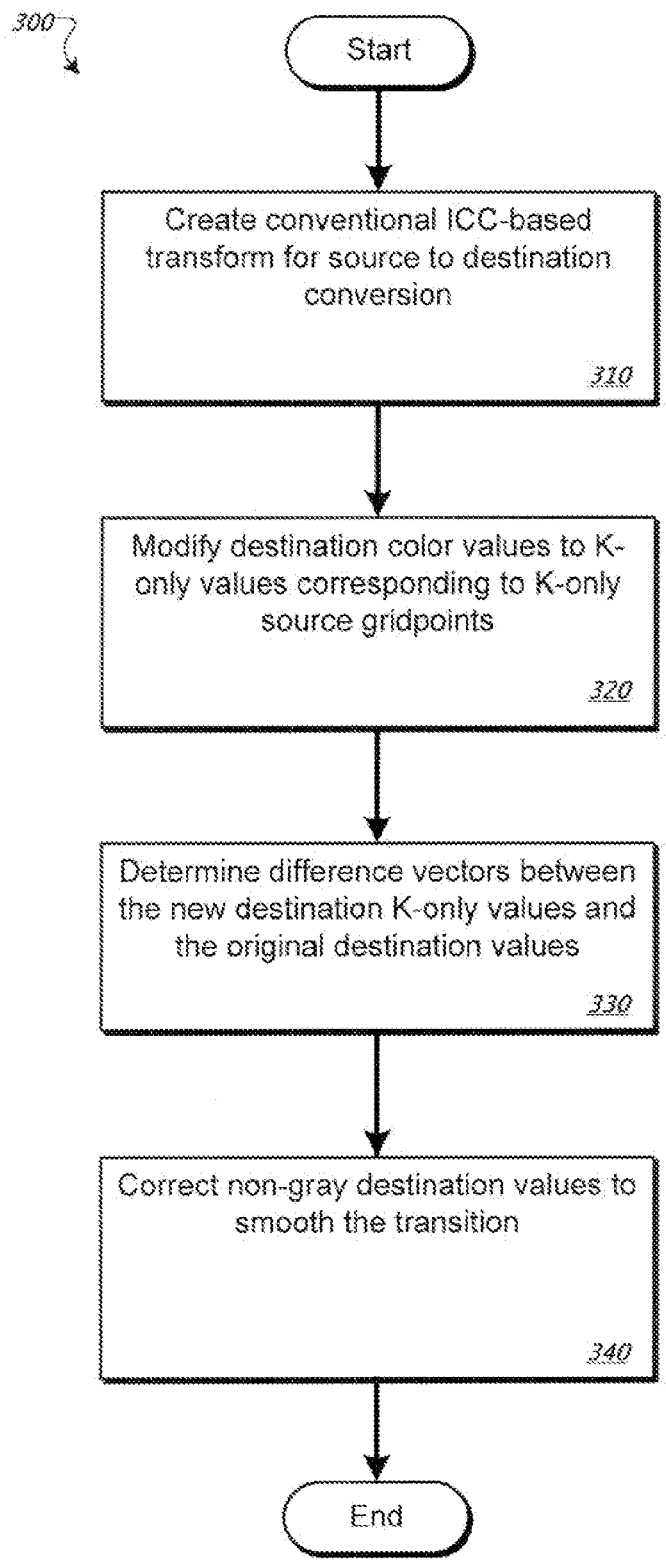
FIG. 3 is a flow chart illustrating a process for creating a LUT to transform color values from a source to a destination color space while preserving K-only values.

FIG. 3 is a flow chart illustrating a process 300 for creating a LUT to transform color values from a source to a destination color space while preserving K-only values. Generally, process 300 involves modifying a conventional LUT using a conversion ramp for pure gray colors and a correction factor for non-gray colors. At 310, a convention LUT transform is created. The conventional LUT may be a four-dimensional LUT that maps a source CMYK color space to a destination CMYK color space. A conventional LUT may be constructed by transforming a regularly spaced grid of colors in the source color space to the destination color space using the ICC profiles of the source and destination color spaces. Each source color space grid point and its corresponding transform point in the destination color space may be stored in the LUT. A LUT may contain any number of grid points, for example a 16×16×16×16 LUT may be created.

At 320, the destination color values in the LUT that correspond to K-only source grid points are modified using a conversion ramp. The conversion ramp is applied to each K-only source grid-point to determine a corresponding K-only value in the destination color space. Each corresponding K-only value is used to modify the LUT by replacing the destination color component values that correspond to the K-only source grid point with zero values for the C, M, and Y components and the corresponding K-only value for the K component. The difference between the original destination color component value and the new K-only value may be calculated, at 330, to determine a difference vector for each. At 340, the remaining original non-gray color values may be modified to smooth the transition between the new K-only values and the non-gray colors. A correction factor may be used to implement the correction for each of the non-gray colors. The correction factors may be determined based on the difference vector and the distance between the non-gray color and the gray axis or plane. The distance may be determined by using the nearest pure gray color as a reference for the gray axis or plane. The correction factor may be zero as the distance of the color from the gray axis increases. The correction factor may also be based on a maximum slope of change, which limits the slope of a line connecting a corrected non-gray color value and the nearest gray color value.

Figure 4:
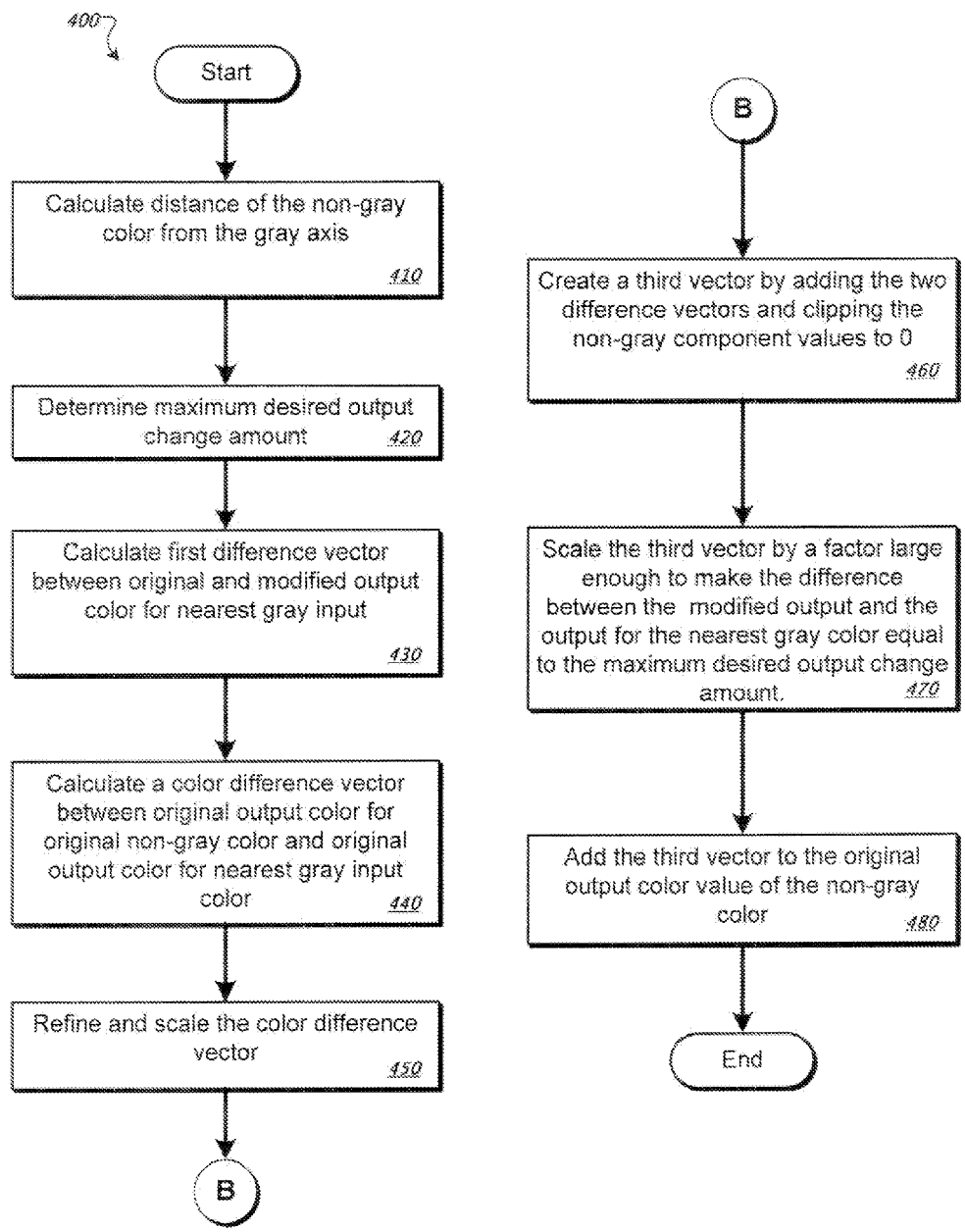
FIG. 4 is a flow chart illustrating a process for smoothing non-gray colors in a transform where the values of gray colors were replace by K-only values.

FIG. 4 is a flow chart illustrating a process for smoothing non-gray colors in a transform where the values of gray colors were replaced by K-only values. In general, a correction factor is determined for and added to each non-gray color in the transform whose corresponding input color is near a pure gray color. The correction factor differs for each non-gray color depending on the non-gray color components and its distance from the gray axis. For some non-gray colors, the correction factor may be determined to be zero or may not be applied or calculated. FIG. 6 is a table of example CMYK inputs of a source color space to be converted to CMYK outputs of a destination color space. The first column 602, contains pure gray grid points, where for each of the sets of four coordinates the first three (CMY) are zero and the fourth increases with increasing intensity of the black level. For example, grid point 606 contains C, M, and Y values of 0 and a K value of 0.8. Within each row, such as row 604, the amount of gray stays the same, but the color value changes, specifically the C component value in this case, as demonstrated by the difference between points 606, 608, and 610, which all have the same K value of 0.8 and varying C values (0, 0.3, and 0.8 respectively). FIG. 7 is a table of example CMYK outputs of a destination color space determined by transforming the example inputs of FIG. 6 using conventional methods. FIG. 8 is a table of example smoothed CMYK outputs of a destination color space determined by transforming the example inputs of FIG. 6 using an embodiment of the subject matter herein described. The rows and columns of FIG. 6 correspond to the rows and columns of FIGS. 7 and 8, such that grid points 706, 708, and 710 are the transforms of grid points 606, 608, and 610 respectively using conventional methods. Likewise, grid points 806, 808, and 810 are the transforms of grid points 606, 608, and 610 respectively using an embodiment of the subject matter herein described.

Turning back to FIG. 4, at 410, the relative distance of the non-gray color from the gray axis or plane is calculated. The distance may be based on the maximum of the color component values (e.g., CMY in a CMYK color space) or may be proportional to a true distance based on the combined distances of each of the color components. For example, referring to FIG. 6, the relative distance between point 608 and point 606 could be calculated as 0.3, which is the distance from the gray axis divided by the maximum distance from the gray axis, where distance in this case is measured by columns.

At 420, a maximum desired output change amount is determined for the non-gray color by multiplying the distance by a desired rate of change for color values. The rate of change may be a factor, such as 1.5, that controls the smoothing gradient. The rate of change may be adjusted to increase or decrease the number of grid points that are corrected with the smoothing. A distance of three grid points, for example, would yield a maximum output change amount of 0.45.

At 430, a first difference vector is calculated between the original and modified output color for the nearest gray input color. This first correction vector may minimize luminance changes. This difference represents the amount that the original transformed gray color in the destination space was shifted to obtain the modified pure gray color in the destination color space, where the modified pure gray color was obtained by setting the C, M, and Y component values to zero and setting the K value to the transform of the K value of the input color space. Here, the nearest gray color to the points 608 and 610 is grid point 606. The difference vector between points 706 (i.e., the original output color value) and 806 (i.e., the modified pure gray output color value), for example, would be (−0.628, −0.56, −0.531, 0.519). In this example, the K only values in the source (at 606) and destination (at 806) match, but this is not necessarily always the case.

At 440, a second difference vector, referred to as a color difference vector, between the original output color for the non-gray color and original output color for nearest gray input color may be calculated. The difference represents the amount that the color shifted from the gray color to the non-gray color. The color components of the color values (e.g., C, M, and Y in a CMYK color space) may be used to calculate the vector. For example, the color difference vector for non-gray grid point 608 and its corresponding output value is found by subtracting output point 706 from 708, which results in a color difference vector of (0.161, 0.032, −0.035).

At 450, the color difference vector may be refined and scaled to be used to determine the amount that the output color values need to be corrected. Once refined and scaled the color difference vector may provide an optional second-order correction that minimizes local color changes. Color errors may be reduced by 50% or more. The gray component difference may be set to zero, and the mean of the remaining color components may be subtracted from each of the remaining components to determine a pure color difference that removes gray levels. For example, the second difference vector determined above would be transformed to (0.1083, −0.02066, −0.08766, 0). Next, negative component values may be clipped to zero to determine a peak color difference. In this example, the result would be the vector (0.1083, 0, 0, 0). This result may then be scaled using optimization factors, which are scale factors associated with each component, and using the maximum of the magnitudes (i.e., absolute value) of the components of the first difference vector. Scale factors optimized over a large set of transforms to generate smallest average color error may be used. For example, a set of scale factors {2, 1, 0.5} may be applied to the C, M, and Y components respectively for optimization purposes. Here, the maximum magnitude in the first difference vector is 0.628. Using the example optimization factors and the maximum magnitude, a modified color vector of (0.1565, 0, 0, 0) is produced.

At 460, a third vector is created by adding the first and modified color difference vectors. Here, the first difference vector (−0.628, −0.56, −0.531, 0.519) added to the modified second vector (0.1565, 0, 0, 0) results in a third vector (−0.4715, −0.56, −0.531, 0.519).

At 470, the third vector may be scaled by a factor large enough to make the difference between the corrected non-gray output and the pure gray output within the maximum desired output change, which in this example is 0.45. That is, the third vector may be multiplied by a positive amount and added to the original output color for original non-gray color, such that the maximum magnitude difference between the modified output color for original non-gray color and modified output color for nearest pure gray color is equal to the maximum desired output change. This scaling may reduce banding artifacts in print. If the positive or a negative amount of the third vector is near zero, an additional small amount (up to 0.1) may be added to avoid further a banding artifact or halo near the amount of zero. In this example, a factor of 0.71895 may be multiplied to properly scale the third vector, which in this case results in (−0.339, −0.4026, −0.3818, 0.3731). Once a suitable multiple of the third vector is obtained, the scaled third vector may be added, at step 480, to the original non-gray output color values to determine the corrected non-gray output color. In this example, point 708 is smoothed by adding the scaled third vector resulting in point 808. FIG. 9 is a table of the differences in the magnitudes of each component as determined between the conventional CMYK outputs and the smoothed CMYK outputs. These values also correspond to the scaled third vectors described above. As can be seen in FIG. 9 (e.g., at 906, 908, and 910), as the non-gray colors become farther from the pure gray axis, the magnitude of correction also decreases. When the non-gray color is sufficiently far enough away from the pure gray axis, no correction may be applied as is demonstrated at 910.

Figure 5:
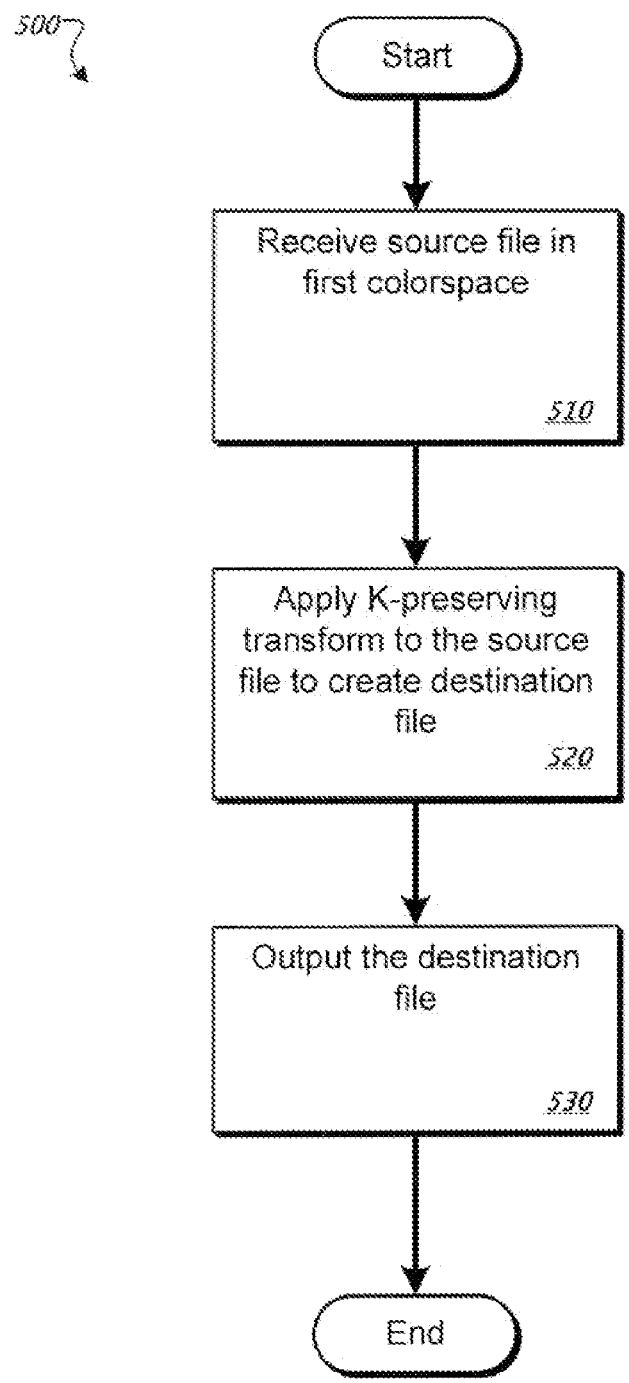
FIG. 5 is a flow chart illustrating a process for converting color data using a LUT to transform color values from a source to a destination color space while preserving K-only values.

FIG. 5 is a flow chart illustrating a process 500 for converting color data using a LUT to transform color values from a source to a destination color space while preserving K-only values. At 510, an input file containing color data in a source color space is received. The input file may conform to any of a variety of standards or formats. The color data is read from the input file. At 520, the color data is transformed to a destination color space. The processes described in FIG. 3 and FIG. 4 may be applied to perform the conversion. At 530, the converted data is placed in an output file. The output file may have the same format as the input file or it may be different. The input file may be modified to create the output file.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   identifying a non-pure gray color value in a color space, wherein the non-pure gray color value includes a plurality of color components and represents a substantially gray color;
   converting the non-pure gray color value to a corresponding pure gray color value in the color space by modifying the plurality of color component values to substantially remove non-gray color components; and
   modifying a selected color value having a plurality of color component values in the color space to at least partially reduce one or more non-gray color component values for the selected color value, wherein the amount of reduction in the non-gray color component values is determined based on at least:
   a difference between the non-pure gray color value and the corresponding pure gray color value; and
   a difference between the selected color value and the non-pure gray color value.

2. The method of claim 1 wherein the color space comprises a target color space defined by a lookup table for converting from a source color space to the target color space, and the non-pure gray color value in the target color space corresponding to a pure gray color value in the source color space, the method further comprising generating a modified lookup table by:
   converting a plurality of non-pure gray color values representing substantially gray colors in the target color space to corresponding pure gray color values in the modified lookup table; and
   modifying a plurality of color values to at least partially reduce one or more non-gray color component values for each color value of the plurality of color values, wherein the amount of reduction in the non-gray color component values is determined based on at least:
   a difference between a particular one of the plurality of non-pure gray color values and the corresponding pure gray color value; and
   a difference between the respective color value and the particular non-pure gray color value.

3. The method of claim 2 wherein the plurality of non-pure gray color values representing substantially gray colors define a substantially pure gray color axis in the target color space and the amount of reduction for each of the plurality of color values increases as the difference between a respective color value and the corresponding particular non-pure gray color value increases.

4. The method of claim 3 wherein the amount of reduction in the non-gray color component values corresponds to a scaled difference between a particular one of the plurality of non-pure gray color values and the corresponding pure gray color value, wherein an amount of scaling is based on the difference between the respective color value and the particular non-pure gray color value.

5. The method of claim 4 wherein the amount of reduction in the non-gray color component values is selected to avoid a rate of change in the color component values in excess of a predetermined threshold as the difference between a respective color value and the corresponding particular non-pure gray color value increases.

6. The method of claim 5 further comprising converting color values in the source color space to color values in the target color space using the modified lookup table.

7. The method of claim 1 further comprising:
   converting a plurality of non-pure gray color values representing substantially gray colors in the color space to corresponding pure gray color values; and
   modifying a plurality of color values to at least partially reduce one or more non-gray color component values for each color value of the plurality of color values, wherein the amount of reduction in the non-gray color component values is determined based on at least:
   a difference between a particular one of the plurality of non-pure gray color values and the corresponding pure gray color value; and
   a difference between the respective color value and the particular non-pure gray color value.

8. The method of claim 7 wherein the amount of reduction in the non-gray color component values is selected to smooth a transition between the pure gray color values in the color space and substantially non-gray color values in the color space.

9. The method of claim 7 wherein the amount of reduction in the non-gray color component values is selected to reduce banding effects in images produced using the color space.

10. The method of claim 7 wherein the amount of reduction in the non-gray color component values is selected to avoid a rate of change in color component values within the color space in excess of a predetermined threshold.

11. A computer readable storage medium storing instructions that, when executed on one or more computers, cause the one or more computers to perform operations comprising:
   identifying a non-pure gray color value in a color space, wherein the non-pure gray color value includes a plurality of color components and represents a substantially gray color;

determining a first difference vector between values of the color components for the non-pure gray color value and a corresponding pure gray color value in the color space; and modifying a selected color value in the color space based on the first difference vector and a second difference vector between the corresponding pure gray color value and a selected color value in the color space.

12. The storage medium of claim 11 wherein the corresponding pure gray color value includes color component values that substantially eliminate contributions of color components other than a gray color component.

13. The storage medium of claim 11 wherein the plurality of color components for the non-pure gray color value combine to produce the substantially gray color.

14. The storage medium of claim 11 wherein the color space comprises a target color space and the selected color value comprises a selected color value in the target color space, the operations further comprising generating a lookup table for converting from a source color space to the target color space, wherein each color value in the target color space corresponds to a color value in the source color space.

15. The storage medium of claim 14 wherein the non-pure gray color value is identified based on a correspondence to a pure gray color value in the source color space.

16. The storage medium of claim 11 wherein the selected color value is modified by an amount determined by scaling the first difference vector, and a degree of scaling is determined according to the second difference vector.

17. The storage medium of claim 16 wherein the degree of scaling increases as the second difference vector increases.

18. A system comprising:
one or more processors; and
at least one storage device storing instructions that, when executed by the one or more processors, cause the one or more processors to:
  identify a non-pure gray color value in a color space, wherein the non-pure gray color value represents a substantially gray color;
  determine a corresponding pure gray color value that is perceptually equivalent to the non-pure gray color value;
  identify a modified color value for a selected color value in the color space, wherein the modified color value includes an increased gray component contribution and a reduced contribution for other color components relative to the selected color value, and an amount of the reduced contribution for the other color components is determined according to a difference between the non-pure gray color value and the corresponding pure gray color value and a difference between the non-pure gray color value the selected color value.

19. The system of claim 18 wherein the at least one storage device further store instructions that cause the one or more processors to generate a lookup table including the modified color value for converting from a source color space to the color space.

20. The system of claim 18 wherein the instructions are adapted to identify the modified color value to smooth a transition between the corresponding pure gray color value and a substantially non-gray color value.

* * * * *